Patented Aug. 4, 1936

2,049,758

UNITED STATES PATENT OFFICE 2,049,758

PROCESS FOR THE PRODUCTION OF GLUCOSIDES OF HIGHER ALIPHATIC ALCOHOLS

Heinrich Bertsch and Gertrud Rauchalles, Chemnitz, Germany, assignors to the firm H. Th. Boehme Aktiengesellschaft, Chemnitz, Germany No Drawing. Application May 31, 1934, Serial No. 728,304. In Germany June 3, 1933

10 Claims. (Cl. 260—25)

This invention relates to processes of producing certain reaction products of sugar compounds with higher aliphatic alcohols and more particularly to glucosides of aliphatic alcohols having more than 6 carbon atoms.

As far as we are aware, no one up to the present time has succeeeded in producing glucosides of higher molecular alcohols in yields of appreciable value. Two methods have been proposed and used for producing glucosides from methyl alcohol and other lower molecular alcohols, however. One of these processes is effected by reacting sugar and alcohol with the aid of hydrochloric acid. The other process involves the reaction of acetohalogenoses, especially acetobromoglucose, with alcohol in the presence of silver carbonate forming acetylated glucoside and thereafter splitting off the acetyl groups. Neither of these methods are suitable for use with alcohols of high molecular weight, for poor yields are obtained.

An object of the present invention is to provide a method of producing glucosides or other related sugar derivatives of higher aliphatic alcohols in better yields.

Another object is to provide a new series of compounds having surface active qualities rendering them suitable for many technical uses.

A further object is to provide a series of compounds suitable as raw materials for the production of textile and other treating agents as by acylation alone or with further additions.

Broadly, the principal process of the present invention involves the reaction of acyl derivatives of sugars or glucosic compounds with higher aliphatic alcohols, by carrying out the reaction in the presence of an acid condensation agent, or dehydrating agent, such as zinc chloride and the removal of the acyl groups from the reaction product. Satisfactory results are accomplished by aiding the reaction through heating to elevated temperatures of from about 70 to 120° C. for a period of one or more hours. The optimum temperature and heating period depends upon the particular materials treated.

The method by which the glocosic compound is acylated forms no part of the present invention, for such processes are already known in the art. Acyl derivatives derived from the lower fatty acids are all utilizable, the acetyl derivative being quite convenient and satisfactory.

The acyl group may be removed from the initial reaction product by any suitable method, simple saponification or splitting with alcohol and potassium hydroxide being preferred.

Various purification methods may be employed for concentrating the products, either the intermediate and/or the final reaction product, the nature and thoroughness of the method selected depending upon the use for which the compounds are intended.

*Specific example*

Into a tank or vessel suitable for heating and provided with an agitator, there is introduced 25 parts of penta-acetyl glucose, 50 parts of lauryl alcohol and 12 parts of anhydrous zinc chloride. This mass is then heated to and maintained at a temperature of about 100° to 105° C., during constant stirring until the reaction has gone as far as it will toward completion, about 1½ to 2 hours usually being sufficient. For obtaining highest yields, overheating should be avoided. Therefore, instead of employing direct flame heat, steam or sand bath heating means are used.

The molten mass obtained is preferably next treated to remove unreacted ingredients. This may be satisfactorily accomplished by agitating the mass with added water, removing the water and the components dissolved therein by treatment with chloroform, washing the chloroform solution to remove the last traces of zinc chloride, distilling off the chloroform and then the unreacted lauryl alcohol with the aid of steam, mixing the residue with chloroform, drying it with anhydrous sodium sulfate and finally evaporating off the liquids, thereby producing a dry product.

To obtain the glucoside of the alcohol from the acetylated dry product, the latter is saponified by treatment with an alcohol solution of potassium hydroxide after which the alcohol is distilled off. If the product is to be used for commercial or technical purposes, no further purification is necessary. If so desired a pure or purer product can be obtained by extracting with ethyl acetate and crystallization.

Glucosides of higher aliphatic alcohols obtained as above described have high surface active qualities and for this reason are suitable as raw materials for the production of a series of highly valuable treating reagents particularly for processing textiles and other fibrous materials, which reagents may be prepared by acylation as the sulfonation of sulfating agents, phosphating agents and similar acid agents, which may be followed, if desired, by neutralization to form water soluble salts.

The alcohols suitable for use in the present process are those of higher molecular weight or having 6 or more carbon atoms, particularly 6 to 18 inclusive. Of most importance are the derivatives produced from lauryl, myristyl cetyl, stearyl and oleyl alcohols. Mixtures of the derivatives of saturated alcohols with those of unsaturated alcohols or with other saturated alcohols show properties of unusual value.

The sugar or glucosic compounds suitable for use in the present invention include of particular interest the monosaccharides, the pentoses and hexoses, as glucose and dextrose.

Other condensing agents than anhydrous zinc chloride may be used in the initial reaction, such for example, as sulphuric acid and zinc hydrochloric acid $H_2ZnCl_4$.

The acyl derivative of the glucosic compound treated in accordance with this invention need not be the penta derivative as disclosed in the example, for compounds containing a smaller or a larger number of acyl groups may also be employed.

Furthermore, it should be understood that the present invention, is not limited to any of the other details set out in the example, either as to substances or procedure, but is limited only by the tenor of the description and the scope of the appended claims.

We claim:

1. The process comprising condensing an acylated sugar with a higher aliphatic alcohol having at least 6 carbon atoms, and removing the acyl groups from the alcohol-sugar reaction product.

2. The process comprising heating acylated sugar with a higher aliphatic alcohol having at least 6 carbon atoms in the presence of an acid condensation agent and thereafter splitting off the acyl groups, thereby forming an alcohol derivative of a sugar compound.

3. The process of producing glucosides of higher aliphatic alcohols comprising reacting an acylated glucosic compound with a higher aliphatic alcohol having at least 6 carbon atoms in the presence of an acid condensation agent at an elevated temperature.

4. The process as described in claim 3 wherein the temperature employed is from 70 to 120° C.

5. The process as described in claim 3 wherein the reaction is carried out in the presence of anhydrous zinc chloride.

6. The process of producing glucosides of higher aliphatic alcohols comprising reacting an acetylated glucosic compound with a higher aliphatic alcohol having from 6 to 18 carbon atoms in the presence of an acid condensation agent at an elevated temperature.

7. The process comprising reacting pentaacetyl glucose with lauryl alcohol in the presence of anhydrous zinc chloride at a temperature of about the range of 100° to 105° C.

8. The process of manufacturing glucosides of higher aliphatic alcohols which comprises heating an acetylated glucosic compound with a higher molecular alcohol having from 6 to 18 carbon atoms in the presence of an acid condensation agent thereby causing said ingredients to react to form an acetyl glucoside of the alcohol employed, and then splitting off the acetyl groups.

9. The process of producing textile treating agents comprising reacting an acylated glucosic compound with a higher aliphatic alcohol having at least 6 carbon atoms with the aid of heat and an acid condensation agent, splitting off the acyl group to produce the glucoside of the alcohol and acylating said glucoside with a strong mineral acid.

10. As a new surface active agent, the glucoside of lauryl alcohol.

HEINRICH BERTSCH.
GERTRUD RAUCHALLES.